(No Model.)

A. GODDARD.
DRILLING MACHINE.

No. 520,142. Patented May 22, 1894.

Witnesses
H. W. Fowler
H. M. Fowler

Inventor
Asa Goddard,
By his Attorney
Rufus B. Fowler

THE NATIONAL LITHOGRAPHING COMPANY,
WASHINGTON, D. C.

UNITED STATES PATENT OFFICE.

ASA GODDARD, OF WORCESTER, MASSACHUSETTS.

DRILLING-MACHINE.

SPECIFICATION forming part of Letters Patent No. 520,142, dated May 22, 1894.

Application filed June 11, 1891. Serial No. 395,957. (No model.)

*To all whom it may concern:*

Be it known that I, ASA GODDARD, a citizen of the United States, residing at Worcester, in the county of Worcester and State of Massachusetts, have invented a new and useful Improvement in Drilling-Machines, of which the following is a specification, reference being had to the accompanying drawings, forming a part of the same, and in which—

Figures 1, 2, 3:
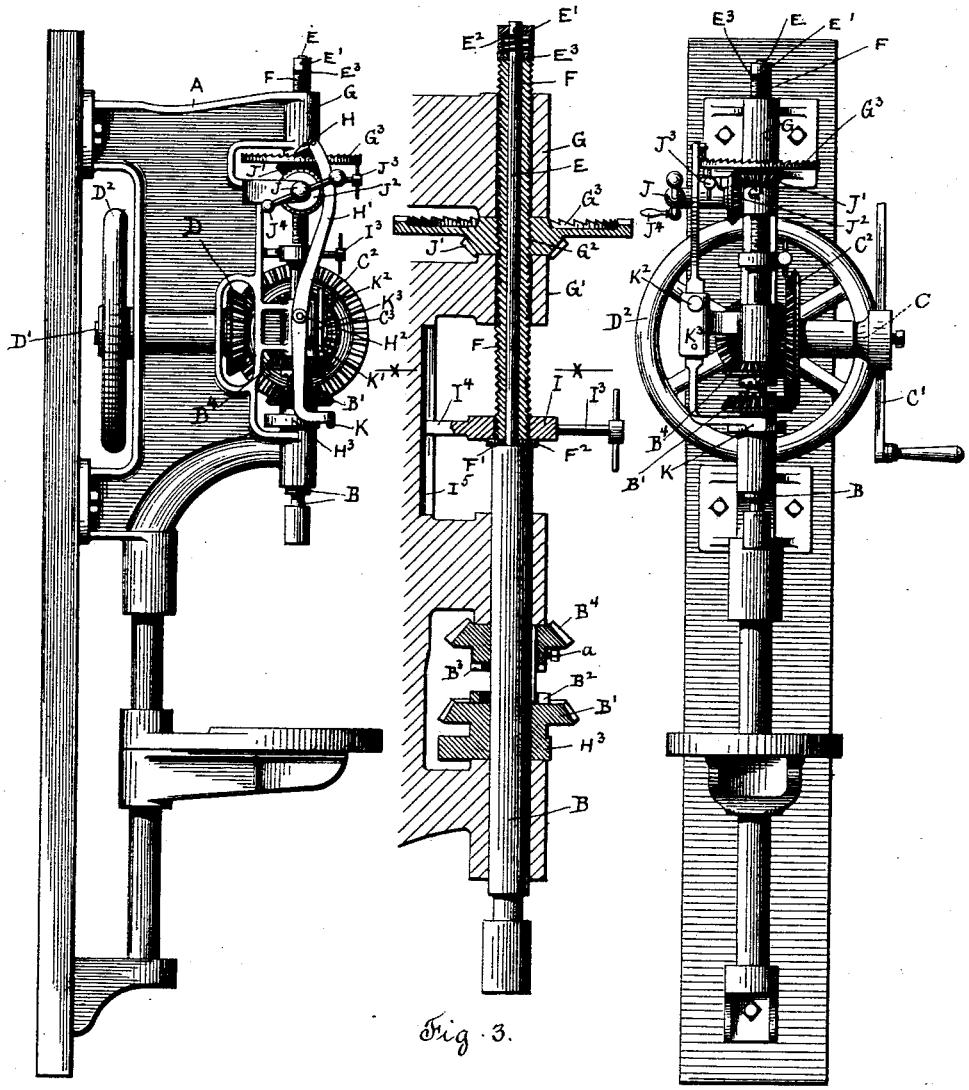
Figure 4:
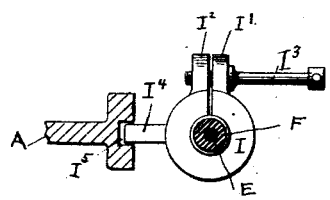

Figure 1, represents a front view of a drilling machine embodying my invention. Fig. 2, is a side view of the same. Fig. 3, is a central sectional view of a portion of the frame and of the feeding screw and Fig. 4, represents a sectional view of the feeding screw on line X, X, Fig. 3, and showing a top view of the clamping device by which the feeding screw is held from rotating.

Similar letters refer to similar parts in the several figures.

My invention relates to certain improvements in that class of drilling machines employed by blacksmiths and carriage makers and sometimes known as blacksmiths' drills and my invention relates to that portion of the drilling mechanism by which the drill spindle is rotated and by which it is fed to the work and withdrawn from the same with a quick return movement.

In the accompanying drawings, A, denotes the supporting frame work, in which is journaled a rotating drill spindle B, carrying a beveled pinion B', turning loosely about the drill spindle B, and provided with clutch teeth $B^2$, which are engaged by clutch teeth $B^3$, upon a beveled pinion $B^4$, which has a spline connection with the drill spindle B, and is capable of a sliding motion on the drill spindle, by which the clutch teeth $B^2$, and $B^3$, are engaged and disengaged at will.

Journaled in the frame work is the crank shaft C, carrying at its outer end the crank arm C', and at its opposite end the beveled gear $C^2$, engaging the beveled pinion B', and also a beveled pinion $C^3$, engaging the beveled pinion $B^4$, upon the drill spindle when the beveled pinion $B^4$, is raised in its highest position, as shown in the accompanying drawings and held in place by the set screw $a$, Fig. 3.

The rotation of the crank shaft C, will cause the beveled pinion B', to turn loosely about the drill spindle B, and will cause a rotary motion to be imparted to the drill spindle B, by means of the beveled pinion $B^4$. If it is desired to increase the speed of the drill spindle relatively to the speed of the crank shaft the set screw $a$, is loosened allowing the beveled pinion $B^4$, to slide downward out of engagement with the beveled pinion $C^3$, and causing its clutch teeth $B^3$, to engage the clutch teeth $B^2$, upon the beveled pinion B'; the rotation of the beveled pinion B', which had before turned loosely about the drill spindle B, will now be imparted through the clutch teeth to the pinion $B^4$, and by means of the spline connection of pinion $B^4$, with the drill spindle B, the drill spindle will be caused to rotate at the same speed as the beveled pinion B'. When the relative speed of the drill spindle is to be decreased, the pinion $B^4$, is lifted into engagement with the pinion $C^3$, and held in its raised position by the set screw $a$, releasing the clutch teeth $B^2$, and $B^3$, and causing the drill spindle B, to be rotated directly by and at the same speed as the pinion $B^4$, and again allowing the pinion B', to turn loosely upon the drill spindle B. This arrangement of the driving gears permits the speed of the drill spindle B, to be varied from fast to slow as the character of the work may demand. The beveled gear $C^2$, also engages a beveled pinion D, upon the short shaft D', placed at right angles with the crank shaft C, and also with the axis of the drill spindle B, and carrying upon its opposite end a balance wheel $D^2$.

The drill spindle B, is provided at its upper end with an extension spindle E, with its diameter reduced, which passes through the hollow feeding screw F, and to the top of the spindle E, is attached the inverted cup shaped washer E', within which is contained a spiral spring $E^2$, with its tension applied to exert a pressure between the cup shaped washer E', and an annular washer $E^3$, resting upon the upper end of the feed screw F.

Between the lower end of the feed screw F, and the shoulder F', of the drill spindle B, is placed an annular washer $F^2$; the washers $F^2$, and $F^3$, being preferably of raw hide, vulcanized fiber, or similar material. The tension of the spring $E^2$, will exert a pressure to force the washers $E^3$, and $F^2$, and the feed screw F, downward against the shoulder F', of the drill spindle B, for the purpose of producing sufficient friction to cause the hollow feeding screw F to be rotated by the rotation of the drill spindle and cause a quick return movement of the drill spindle when the hollow feed screw is released and the actuating nut $G^2$ is held as hereinafter described.

The feed screw F, is held in bearings G, G', and between the bearings G, G', is placed the nut $G^2$, engaging the feed screw F, and having a crown ratchet wheel $G^3$, to which an intermittent rotary motion is imparted by means of the pawl H, lever H', pivoted at $H^2$, and eccentric $H^3$, upon the hub of the pinion B'. Inclosing the feeding screw F, is a split clamping ring I, provided with lugs I', $I^2$, carrying a tightening screw $I^3$, by which the ring I, is clamped upon the feed screw F.

The clamping ring I, is provided with a tail piece $I^4$, entering a groove $I^5$, in the frame A, of the machine, by which the clamping ring I, is held from rotation about the axis of the drill spindle.

In the operation of drilling, the screw $I^3$, is tightened clamping the ring I, upon the feed screw F, thereby preventing the rotation of the feed screw and allowing the rotation of the nut $G^2$, as actuated by the pivoted lever H', and pawl H, to impart a longitudinal movement to the feed screw F, moving it and the connected drill spindle downward toward the work. When the operation of drilling is completed, a quick return movement is imparted to the drill spindle by loosening the screw $I^3$, thereby releasing the clamping ring I, and allowing the feed screw F, to rotate with the drill spindle B, by means of the friction between the ends of the screw F, and the washers $F^2$, and $F^3$, the pawl H, having been disengaged from the ratchet-wheel $G^3$, and the nut $G^2$, being held from rotation by the friction of the shaft J, which is connected with the nut $G^2$, by means of the pinions J', $J^2$. The short shaft J, is journaled in a split box which is tightened by a screw $J^3$, in order to secure the requisite friction upon the shaft J, to hold the nut $G^2$, from turning and the shaft J, is also provided with a crank $J^4$, by which a feeding motion may be imparted to the drill spindle by hand. The feed actuating lever H', is bent at right angles and extends in a horizontal plane at K, to be actuated by the rotating eccentric $H^3$, and the end K, is pressed toward the eccentric by a spiral spring K', and the angular movement of the lever is limited by an adjusting screw $K^2$, the screw $K^2$, and the spring K', being held in a plate $K^3$, supported by the frame work of the machine.

What I claim as my invention, and desire to secure by Letters Patent, is—

1. In a drilling machine, the combination of a drill spindle, a crank shaft, driving gears of different diameters attached to said crank shaft, a pinion B' engaging the larger of said driving gears and turning loosely upon said drill spindle, said pinion being provided with clutch teeth $B^2$, a pinion $B^4$ having a spline connection with said drill spindle and adapted to engage the smaller of said driving gears, said pinion being capable of sliding on said drill spindle and having clutch teeth $B^3$ adapted to engage the clutch teeth $B^2$, whereby said drill spindle is rotated at different velocities by the engagement of said pinion $B^4$ with the smaller of said driving gears and by the engagement of said clutch teeth $B^2$ and $B^3$, substantially as described.

2. In a drilling machine, the combination with a rotating drill spindle, of a hollow feeding screw carried concentrically on said drill spindle and held from longitudinal movement thereon, a rotating nut on said feeding screw and held from longitudinal movement thereon and means, substantially as described, whereby said feeding screw is held from rotation and a feeding motion thereby imparted to said drill spindle by the rotation of said nut, substantially as described.

3. In a drilling machine, the combination with a drill spindle, of a hollow screw held concentrically on said drill spindle and prevented from longitudinal movement thereon, said feeding screw having a frictional connection with said drill spindle, whereby it is made to rotate by the rotation of the drill spindle and a nut inclosing said feeding screw and capable of being held in a fixed position, whereby the rotation of said drill spindle and connected feeding screw will cause a longitudinal movement of said drill spindle, substantially as described.

4. In a drilling machine, the combination with a drill spindle provided with a section E having a reduced diameter forming a shoulder F' of a hollow feeding screw F carried on said reduced section E, a collar E' attached to the section E, a spiral spring $E^2$ placed between said collar and the end of said hollow feeding screw, with its tension applied to carry said feeding screw toward said shoulder F' and cause said feeding screw to be rotated by said spindle, substantially as described.

5. In a drilling machine, the combination with a rotating drill spindle, of a hollow feeding screw carried concentrically on said drill spindle and held from longitudinal movement thereon, a clamping ring held on said feeding screw, said clamping ring engaging the fixed frame work of the machine, whereby said feeding screw is held from rotation, but is allowed a longitudinal feeding movement and a rotating actuating nut engaging said feeding screw, whereby a longitudinal feeding movement is imparted to said screw and connected drill spindle, substantially as described.

6. In a drilling machine, the combination of a drill spindle, a feeding screw carried concentrically on said drill spindle and held from longitudinal movement thereon, a rotating nut engaging said screw, a beveled pinion formed on said nut, a crank shaft journaled in a split box, a pinion on said crank shaft engaging the pinion on said nut and a tightening screw by which friction is applied to said crank shaft, substantially as described.

Dated at Worcester, in the county of Worcester and State of Massachusetts, this 22d day of May, 1891.

ASA GODDARD.

Witnesses:
RUFUS B. FOWLER,
HENRY W. FOWLER.